United States Patent
Ausman et al.

(10) Patent No.: US 8,103,393 B2
(45) Date of Patent: Jan. 24, 2012

(54) AIRCRAFT EXHAUST GAS TEMPERATURE MONITOR

(75) Inventors: Marc Ausman, Albuquerque, NM (US); Kevin DeVries, Albuquerque, NM (US)

(73) Assignee: Vertical Power, Inc., Albuquerque, NM (US)

( * ) Notice: Subject to any disclaimer, the term of this patent is extended or adjusted under 35 U.S.C. 154(b) by 720 days.

(21) Appl. No.: 11/875,818

(22) Filed: Oct. 19, 2007

(65) Prior Publication Data

US 2009/0306837 A1 Dec. 10, 2009

Related U.S. Application Data

(63) Continuation-in-part of application No. 11/311,060, filed on Dec. 19, 2005.

(60) Provisional application No. 60/853,712, filed on Dec. 23, 2006.

(51) Int. Cl.
*G06F 7/70* (2006.01)
*G06F 19/00* (2011.01)
*G06G 7/00* (2006.01)

(52) U.S. Cl. ........... 701/14; 701/3; 701/4; 701/8; 701/9; 701/15; 123/435; 123/672; 123/673; 244/75.1; 244/220; 244/99; 340/945; 340/963

(58) Field of Classification Search .................. 701/1, 3, 701/8–11, 14, 99–104, 108–109, 115; 340/945, 340/963, 964, 952, 953, 971; 244/75.1, 76 R, 244/194, 196, 197, 220, 99; 123/434–435, 123/672–676
See application file for complete search history.

(56) References Cited

U.S. PATENT DOCUMENTS

| | | | |
|---|---|---|---|
| 4,127,847 A | 11/1978 | Stifter | |
| 4,191,347 A | 3/1980 | Fueyo | |
| 4,243,970 A | 1/1981 | Hardee et al. | |
| 4,409,635 A | 10/1983 | Kraus | |
| 4,452,207 A * | 6/1984 | Moore, Jr. | 123/676 |
| 4,598,890 A | 7/1986 | Herzog et al. | |
| 4,649,484 A | 3/1987 | Herzog et al. | |
| 4,729,102 A | 3/1988 | Miller | |
| 5,001,638 A | 3/1991 | Zimmerman | |
| 5,082,208 A | 1/1992 | Matich | |
| 5,353,657 A | 10/1994 | Bainbridge, III | |
| 5,497,072 A | 3/1996 | LeComte et al. | |
| 5,723,915 A | 3/1998 | Maher et al. | |
| 5,864,221 A | 1/1999 | Downs et al. | |
| 5,913,492 A | 6/1999 | Durandeau et al. | |
| 5,941,222 A | 8/1999 | Braly | |
| 6,325,333 B1 | 12/2001 | Najmabadi et al. | |

(Continued)

OTHER PUBLICATIONS

Web pages at http://www.tcwtech.com/, (visited on Jan. 26, 2008 and Jan. 27, 2008).

*Primary Examiner* — Jack W Keith
*Assistant Examiner* — Rami Khatib
(74) *Attorney, Agent, or Firm* — V. Gerald Grafe (57) ABSTRACT

A computer-implemented function monitors and displays exhaust gas temperatures (EGT) in a plurality of cylinders in an engine. The invention provides an easy way to read exhaust gas temperature on a specific cylinder, and to provide a means for leaning the engine while in a climb. Efficient leaning in a climb reduces fuel consumption and reduces the chance of harmful conditions that can lead to engine failure.

13 Claims, 6 Drawing Sheets

U.S. PATENT DOCUMENTS

| | | |
|---|---|---|
| 6,346,892 B1 | 2/2002 | DeMers et al. |
| 6,556,902 B2 | 4/2003 | Ing et al. |
| 6,639,522 B2 | 10/2003 | Derderian |
| 6,664,945 B1 | 12/2003 | Gyde et al. |
| 6,700,482 B2 | 3/2004 | Ververs et al. |
| 6,754,567 B2 | 6/2004 | Bernard |
| 6,824,099 B1 | 11/2004 | Jones |
| 6,842,672 B1 | 1/2005 | Straub et al. |
| 6,859,688 B1 | 2/2005 | Orf et al. |
| 7,021,587 B1 | 4/2006 | Younkin |
| 7,039,518 B2 * | 5/2006 | Ingram et al. ............... 701/103 |
| 2002/0035415 A1 | 3/2002 | Gardner |
| 2002/0035416 A1 | 3/2002 | De Leon |
| 2003/0048203 A1 | 3/2003 | Clary |
| 2005/0187677 A1 | 8/2005 | Walker |
| 2009/0306839 A1 * | 12/2009 | Youngquist et al. ............ 701/14 |
| 2010/0076630 A1 | 3/2010 | Vian |

\* cited by examiner

AIRCRAFT EXHAUST GAS TEMPERATURE MONITOR

CROSS-REFERENCE TO RELATED APPLICATIONS

This application claims the benefit of U.S. provisional application 60/853,712, filed Oct. 23, 2006, which is incorporated herein by reference. This application claims the benefit as a continuation-in-part of U.S. patent application Ser. No. 11/311,060, filed Dec. 19, 2005, which is incorporated herein by reference.

This application is related to the following applications, each of which is incorporated herein by reference:

Aircraft Emergency Handling, U.S. patent application Ser. No. 11/875,813, filed on the same date hereof;

Backup Electrical Power System for Solid-State Aircraft Power Distribution Systems, U.S. patent application Ser. No. 11/875,815, filed on the same date hereof;

Aircraft Electrical System Evaluation, U.S. patent application Ser. No. 11/875,816, filed on the same date hereof;

Variable Speed Flap Retraction and Notification, U.S. patent application Ser. No. 11/875,819, filed on the same date hereof.

FIELD OF THE INVENTION

This invention relates to the field of aircraft control, and more specifically to systems that provide for monitoring of aircraft exhaust gas temperature such as during lean climb conditions.

BACKGROUND

The present invention relates to avionics. Modern commercial/private aircraft, as well as older aircraft, include a myriad of instrumentation panels associated with electronic devices having controls, displays, and software applications, which are used to present information to pilots and/or copilots during flight. The electronic devices, controls, displays and applications are interfaced together to form avionics equipment within the aircraft. Pilots (where "pilot" includes copilots and any other controller of the aircraft) access one or more interface devices of the avionics equipment prior to and during the flight. Some of the information presented monitors the status of equipment on the aircraft, while other switches and knobs are used to control functions of the aircraft such as throttles (engine speed), switches (lights, radios, etc), levers (landing gear and flaps), and controls for navigation, for example.

Currently, pilots must manually adjust the fuel to air ratio (called mixture) going into the cylinders. As a pilot climbs, the air becomes less dense and therefore the amount of fuel should be reduced as well. The process of adjusting the mixture is commonly called "leaning the engine." However, to avoid damage to the engine from improper leaning, the pilot must carefully monitor and adjust the mixture at frequent intervals.

Current methods of managing mixture involve monitoring exhaust gas temperature of one or more cylinders, typically showing either a full-range bar graph that displays temperature ranges spanning about 700 degrees F., or an analog temperature display. The large range displayed on the bar graphs makes it difficult to precisely manage the EGT temperature graphically. The analog temperature display can allow for more precise reading of EGT, but does not allow setting (or adjusting) of temperature range reminders, target temperature, change in specification of a reference cylinder, or alerts if the sensed temperature goes out of an adjustable target range. Accordingly, there is a need for methods and apparatuses that provide pilots with more efficient instruments for EGT management during climb.

Other U.S. patents of interest relative to this disclosure include the following, each of which is incorporated herein by reference: U.S. Pat. No. 7,039,518 "Computer method and apparatus for aircraft mixture leaning"; U.S. Pat. No. 4,452,207 "Fuel/air ratio control apparatus for a reciprocating aircraft engine"; U.S. Pat. No. 5,941,222 "Optimizing the efficiency of an internal combustion engine"; U.S. Pat. No. 6,556,902 "Method of monitoring and displaying health performance of an aircraft engine"; and U.S. Pat. No. 6,842,672 "Cockpit instrument panel systems and methods with redundant flight data display".

SUMMARY OF THE INVENTION

A computer-implemented function monitors and displays exhaust gas temperatures (EGT) in a plurality of cylinders in an engine. The lean climb function provides an easy way to read exhaust gas temperature on a specific cylinder, and to provide a means for leaning while in a climb. Efficient leaning in a climb reduces fuel consumption and reduces the chance of harmful conditions that can lead to engine failure.

A method according to the present invention can comprise accepting an indication of a temperature display range, wherein the temperature display range is less than the full range of possible exhaust gas temperatures (e.g., 40%, 20%, or 10% of the full range). A reference cylinder can be specified, and the exhaust gas temperature of the reference cylinder sensed and displayed relative to the indicated display range. The display relative to a reduced range facilitates easier interpretation of the exhaust gas performance by the pilot, facilitating more efficient management of the aircraft.

The present invention can also provide for display of exhaust gas temperatures in multiple cylinders, allowing the pilot a more comprehensive view of the engine's performance. It can also provide for alerts to the pilot if the exhaust gas temperature in the reference cylinder (or, any cylinder) reaches a value that is outside of a predetermined range, normally much smaller than the full range of possible temperatures. The exhaust gas display can be provided in response to requests from the pilot, allowing the instrument panel, and the pilot's attention, to be occupied with exhaust gas temperature display only when that information is relevant to the operation of the aircraft.

An apparatus according to the present invention can comprise sensors mounted with the engine to sense the exhaust gas temperature (or other correlated engine performance parameter) of one or more cylinders of the engine (or of multiple engines in a multi-engine aircraft). A controller such as a single board computer can read the sensors to determine the exhaust gas temperature in each cylinder sensed. The controller can allow a pilot to input a request for an exhaust gas temperature display, and to input desired display ranges, target exhaust gas temperatures, reference cylinder identification, temperatures at which to generate alerts, or combinations thereof. The controller can use the display to communicate to the pilot the exhaust gas temperature of the reference, and optionally other, cylinders, relative to a display range that is less than the full range of possible temperatures. The controller can also highlight temperatures that are near or exceed temperature ranges or limits, and can provide alerts (e.g., audible or visible signals) to the pilot when temperatures are near or exceed temperature ranges or limits.

BRIEF DESCRIPTION OF THE DRAWINGS

FIG. 4(a,b) are schematic illustrations of a pilot display according to an example embodiment of the present invention.

DETAILED DESCRIPTION OF THE INVENTION

The present invention provides methods and apparatuses for sensing EGT attributes of an aircraft engine and efficiently communicating those attributes to a pilot. The invention enables a pilot to accurately lean the engine during a climb using a technique of maintaining the EGT of a specific reference cylinder to within a small range of a reference temperature. An indication of the EGT (or the EGT's status relative to the reference temperature) can be communicated to the pilot by, for example, display on a graphic display screen such as a liquid crystal display.

Figure 1:
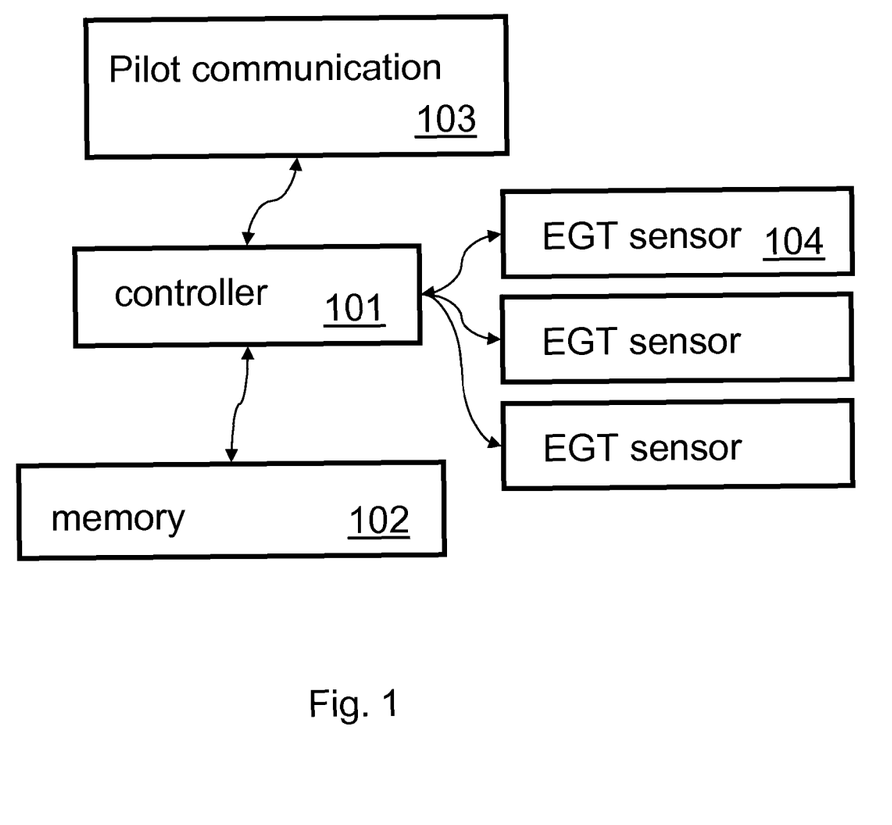
FIG. 1 is a schematic illustration of an apparatus according to an example embodiment of the present invention.

FIG. 1 is a schematic illustration of an apparatus according to an example embodiment of the present invention. A controller 101, such as a single board computer, controls a memory device 102 and a pilot communication system 103, for example a touch sensitive display, or a display and input buttons, or an audible communication system. One or more engine sensors 104 are mounted with the aircraft such that they can sense the operation of the engine. For convenience of the description herein and conformance with current practice, these sensors are described as sensing the exhaust gas temperature of specific cylinders, although the term "exhaust gas sensor" and "exhaust gas temperature" (or "EGT") refers to any engine parameter that can be sensed and that relates to the operation of the engine as affected by the fuel-air mixture.

The controller 101 can accept an indication that a display of EGT is desired, for example by accepting an input from the pilot such as a button press or a voice command. The controller 101 can determine the EGT of one or more cylinders from the sensors 104, and access from the memory one or more parameters relative to the display, such as reference cylinder (an indication of a cylinder to highlight in the display, and to use in any alerts or prompts); display range (a range of EGT values to be represented on the display, rather than the full range of possible EGT values as with previous displays); target EGT (an EGT value to be used as a target or desired value); alert values (high or low temperature EGT values that trigger alerts if the EGT in a reference cylinder reaches the value); prompts and values (EGT values and associated prompts such as a "too lean" prompt to be communicated to the pilot if the EGT reaches a certain value). The controller 101 can then communicate the current performance of the engine, as based on the sensed EGT and relative to the parameters read from the memory. As an example, the controller 101 can display a bar graph of the EGT of the reference cylinder, with the upper and lower limits corresponding to the display range, and the actual current EGT value depicted within that range. As another example, the controller 101 can display an alert corresponding to an alert condition, or can communicate an audible alert or prompt if indicated by the current EGT value.

Figure 2:
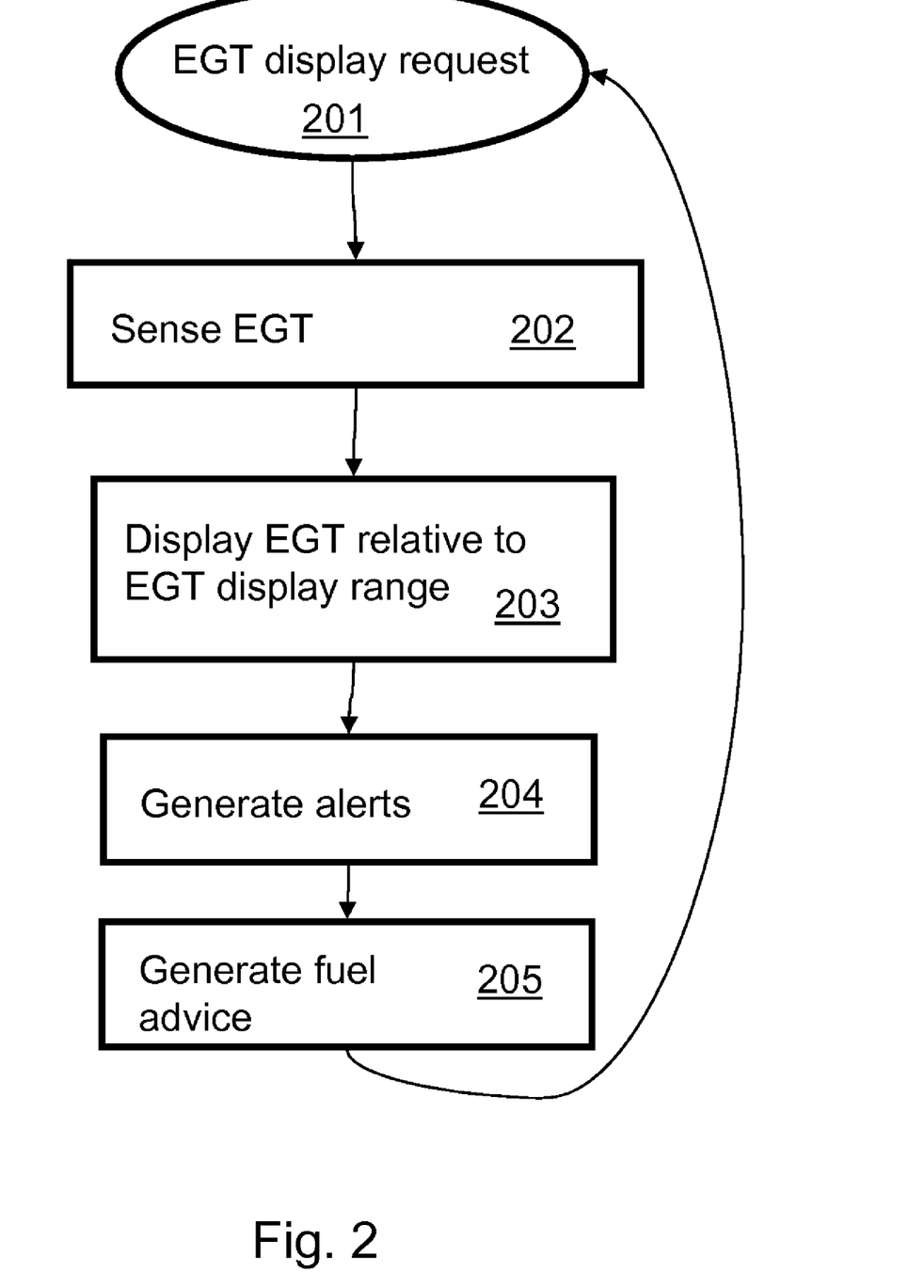
FIG. 2 is a flow diagram of an example method according to the present invention.

FIG. 2 is a flow diagram of an example method according to the present invention. The example method can be implemented in computer software in a controller and system like that described in connection with FIG. 1. The method begins with an indication that an EGT display is desired 201. This indication can be, for example, a direct pilot input, or can be determined from sensing the operation of the aircraft (e.g., in flight and altitude is increasing above a certain rate). The EGT of one or more cylinders of an engine can be sensed 202. The EGT can then be communicated to the pilot 203, for example by displaying the EGT and associated prompts or alerts 204 relative to one or more operating parameters such as display range, high temperature alert, low temperature alert, target value, high temperature prompt (such as fuel mixture guidance 205), and low temperature prompt.

Figure 3:
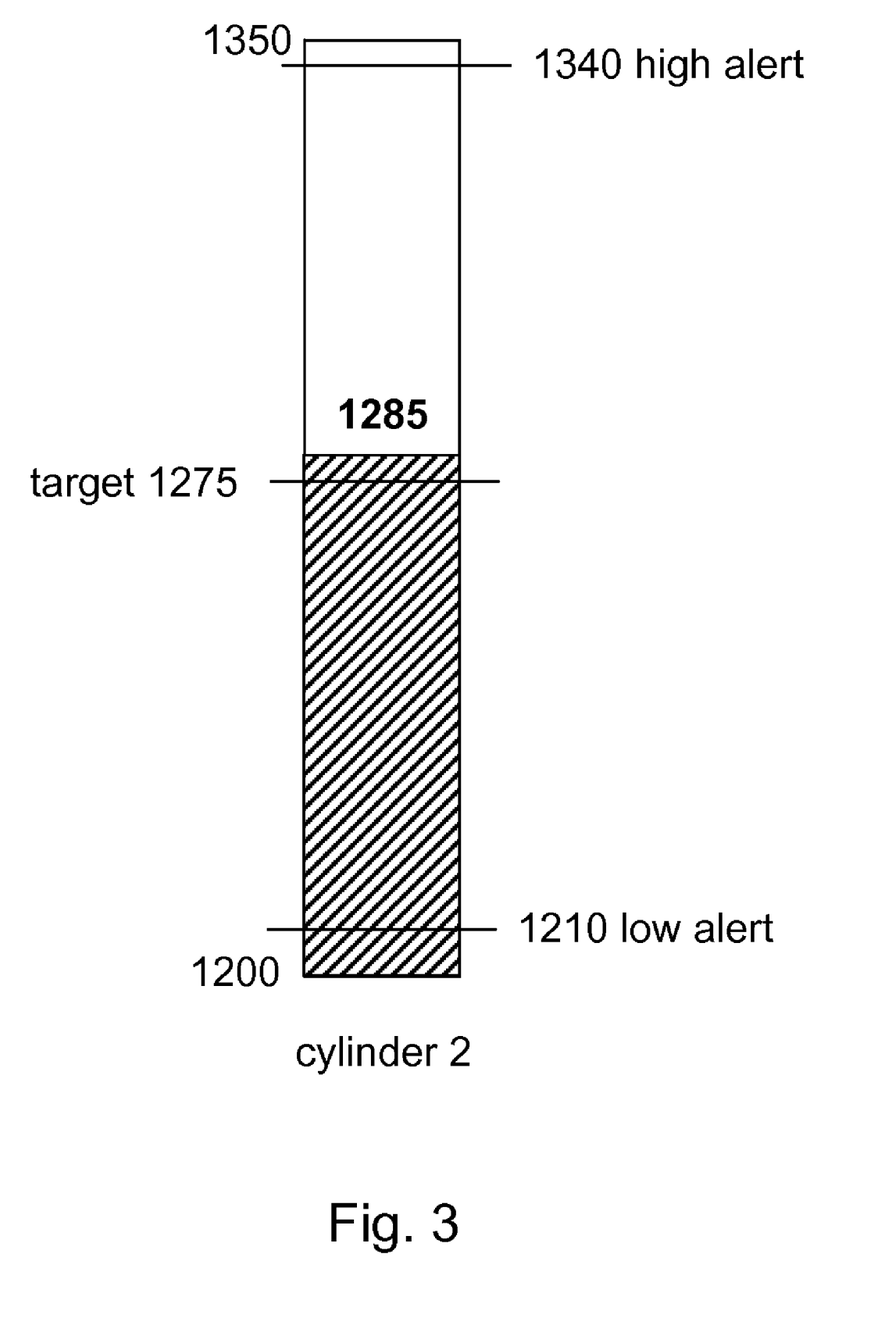
FIG. 3 is a schematic illustration of a pilot display according to an example embodiment of the present invention.

FIG. 3 is a schematic illustration of a pilot display according to an example embodiment of the present invention. The values presented in the figure are for discussion only; the values in an actual implementation can depend on the aircraft, its engine, operating parameters, and pilot preferences. Also, not all of the display parameters are required for all applications. In the figure, an EGT display range has been established as extending from 1200 to 1350 degrees Fahrenheit. A target EGT has been established as 1275 degrees Fahrenheit. The most recent sensed EGT of cylinder 2, indicated as the reference cylinder, is 1285 degrees Fahrenheit. A high temperature alert has been established at 1340 degrees Fahrenheit; a low temperature alert has been established at 1210 degrees Fahrenheit. As the EGT of the reference cylinder varies, the bar graph can be changed to correspond to the most recent sensed EGT. The pilot thus has a current reading of the EGT in the reference cylinder, and the relationship of the actual EGT to the established display range is easily appreciated. If the EGT reaches either the low or high temperature alert limit, then the system can provide a visible alert, or an audible alert such as a warning tone, to facilitate pilot attention to the engine operation as indicated by the EGT. The various parameters can be established as part of the installation of a suitable control system, for example to correspond with engine or aircraft specifications. Some or all of the parameters can also be established by the pilot, either as part of a setup function, or while in flight, to allow the pilot to customize the presentation of the EGT information to a manner most useful to the pilot.

Figure 4A:
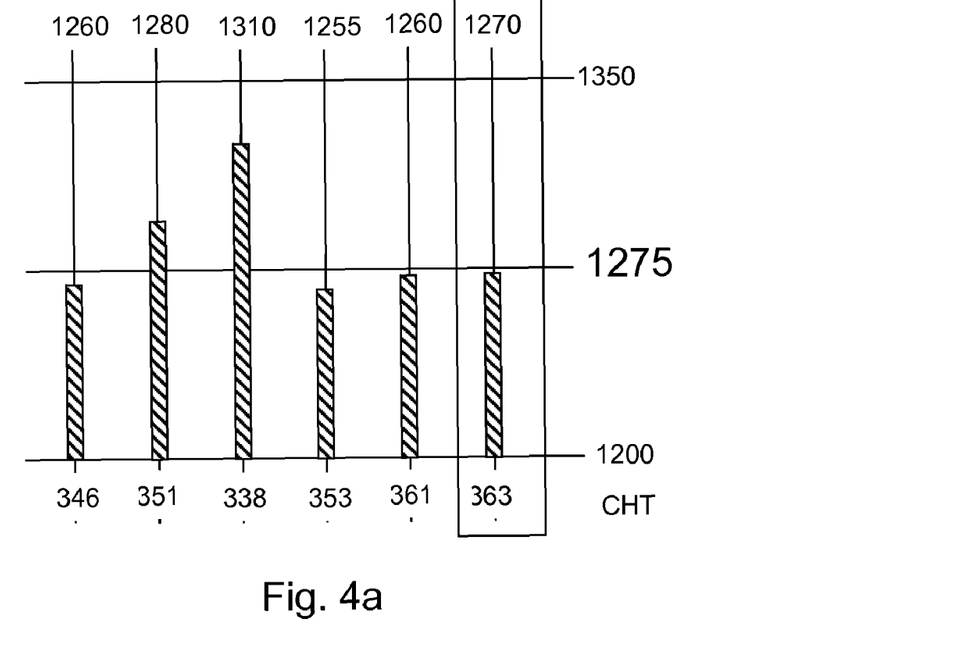

FIG. 4(a,b) are schematic illustrations of a pilot display according to an example embodiment of the present invention. In FIG. 4a, the EGT of 6 cylinders is displayed, all relative to a display range extending from 1200 to 1350 degrees Fahrenheit. The cylinder head temperature of each cylinder is also displayed. A target EGT has been established at 1275 degrees Fahrenheit, and is also displayed. The rightmost display corresponds to a reference cylinder, which temperature is equal to the target value in FIG. 4a.

Figure 4B:
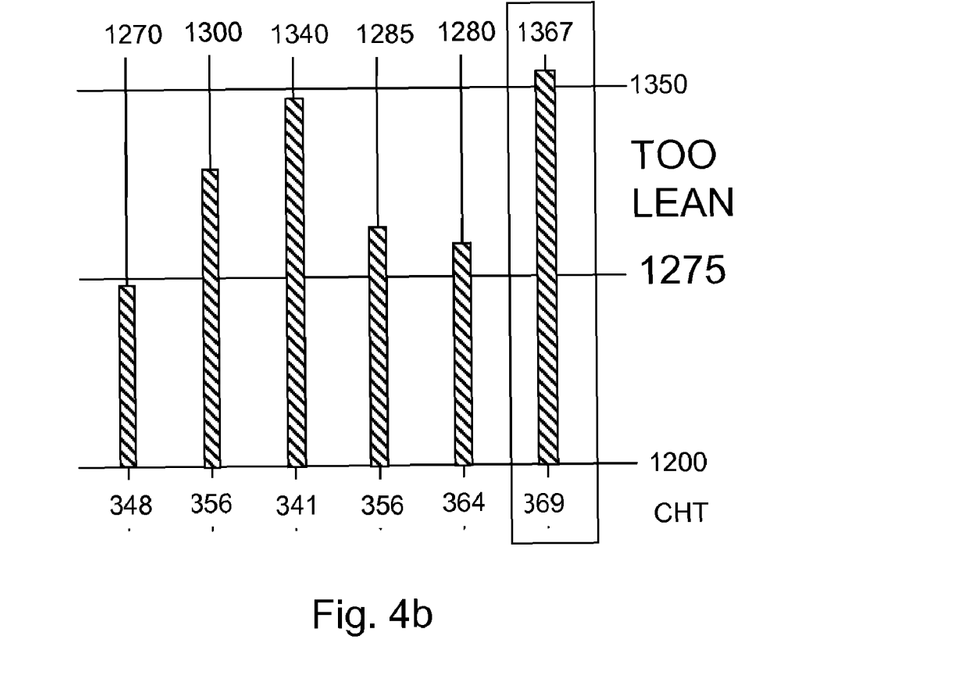

In FIG. 4b, the aircraft is operating with a fuel mixture too lean for proper operation, as indicated by the increased EGT and in particular by the EGT of the reference cylinder exceeding the 1350 degrees Fahrenheit alert limit. The pilot is presented with a prompt that the mixture is "TOO LEAN" to remind the pilot to adjust the mixture. An audible alert, such as a warning tone, can also be supplied to further encourage pilot attention to the EGT condition. The display of the EGT can be approximately linear with EGT for EGT values within the display range. For EGT values outside the display range, the display can be truncated, can extend beyond the display range a fixed distance, or can be mapped to a different scale such that large EGT differences can be mapped to a small region of the display. Such out-of-range EGT values can be displayed in a different color, shape, or other presentation to give the pilot ready knowledge that the EGT display is out of the linear display range.

Figure 5:
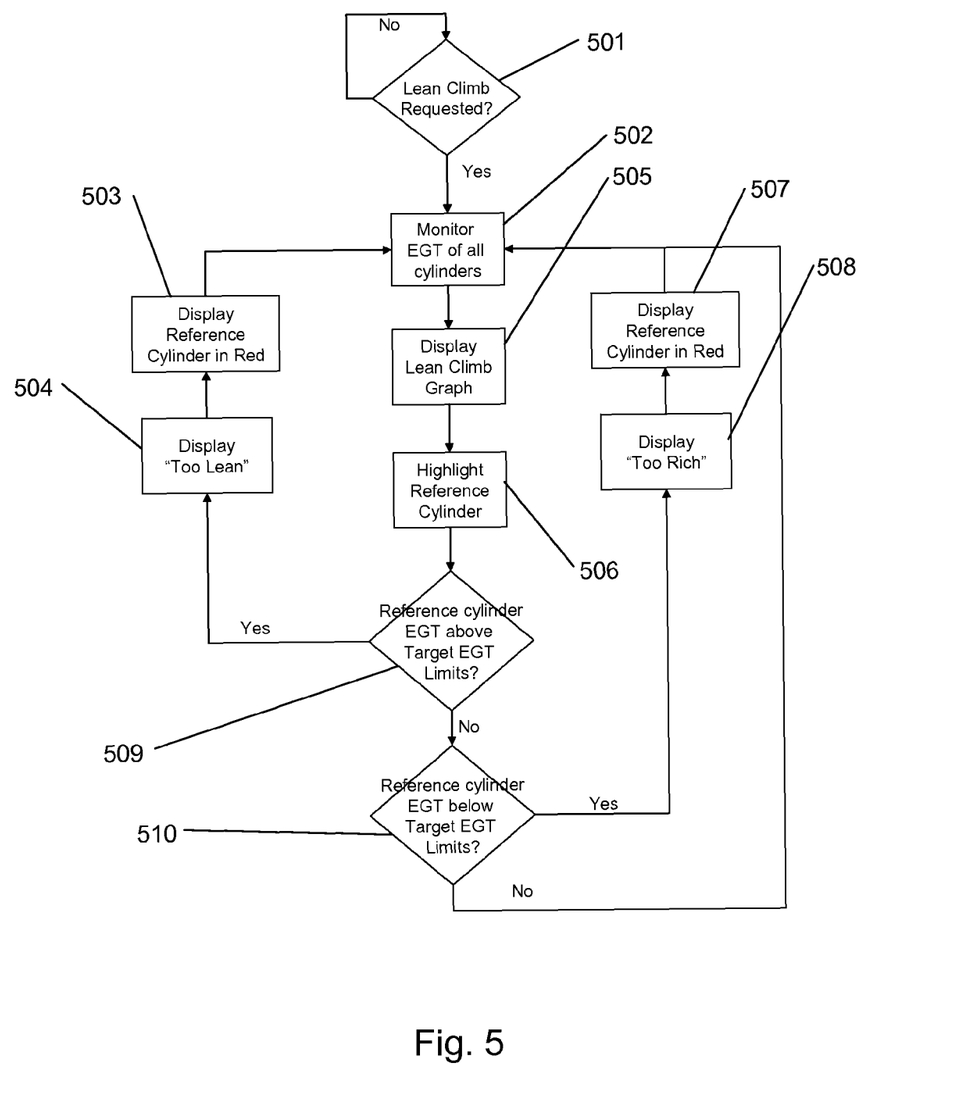
FIG. 5 is a flow diagram of an example method according to the present invention.

FIG. 5 is a flow diagram of an example method according to the present invention. The method begins when a lean climb display function is requested 501. The EGT of the cylinders in the engine can be monitored 502. A lean climb graph, for example like those described above, can be displayed 505. The EGT of a reference cylinder can be highlighted in the display 506. The EGT of the reference cylinder can be compared to a target EGT upper limit 509. If the reference cylinder EGT exceeds the target EGT upper limit, then a relevant message such as "Too Lean" can be displayed 504, and the EGT display of the reference cylinder can be highlighted such as by displaying the EGT in red 503. If the EGT of the reference cylinder is not above the target EGT limit 509, then the EGT of the reference cylinder can be compared against a target EGT lower limit 510. If the reference cylinder EGT is below the target EGT lower limit, then a relevant message such as "Too Rich" can be displayed, and the EGT display of the reference cylinder can be highlighted such as by displaying the EGT in red 507.

Example Embodiment

Figure 6:
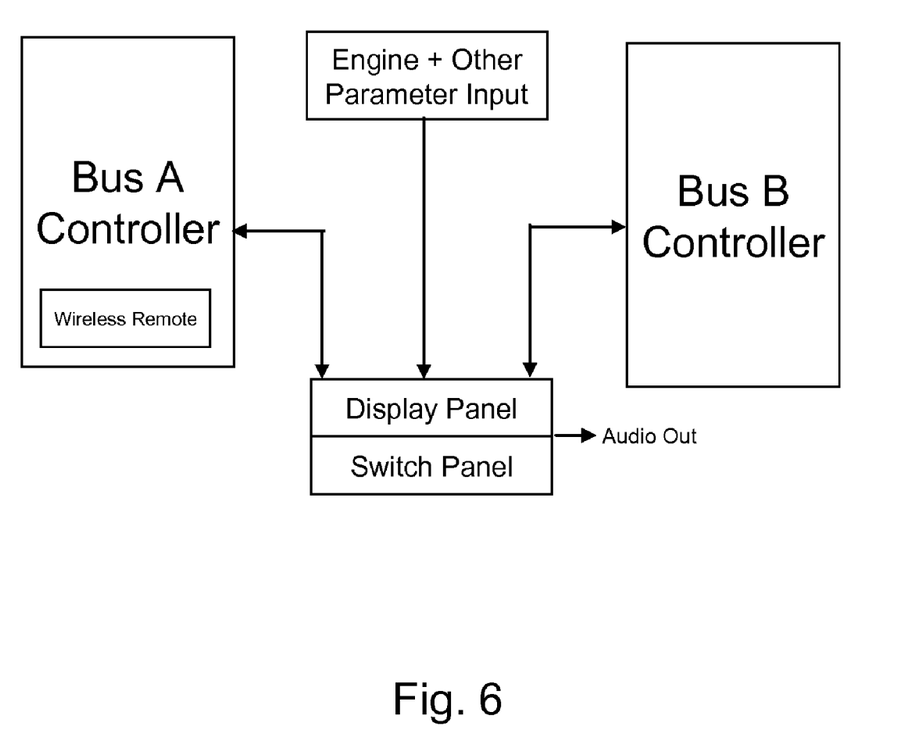
FIG. 6 is a schematic illustration of an example embodiment of the present invention.

FIG. 6 is a schematic block diagram of an example embodiment of the present invention. A Display Panel accommodates communication of information to a pilot. A Switch Panel accommodates communication of information from a pilot. A single or dual redundant controller(s) can be used to determine state, to set controls, to control the display, to accept input in between the sensors and the display/switch. Sensors corresponding to various attributes of aircraft, such as those discussed above, provide information to the controller. The controller determines the state of the aircraft from the attributes, for example as described above. The controller sends information to the display which accepts input based on the determined state. For example, the controller can accept input from one or more switches, where the switches are defined to have specific meanings depending on the determined state. The controller initiates control of various aircraft attributes, for example those described above, based on the determined state and on pilot input. While the controller and display functions are described separately for convenience, they can be integrated in a single system, or part of the controller can be integrated with the display while part is separate from the display.

A suitable display panel can comprise appropriate technology for aircraft use. A width of no more than 6.25" can allow the system to readily fit in a standard radio rack. The system can operate in all temperature ranges expected in the aircraft cockpit environment, for example, typically −30 deg C. to +70 deg C. The screen can be daylight readable, for example with a transflective screen or transmissive screen with a brightness greater than about 500 nits. A suitable switch panel can comprise a portion of a touch sensitive display configured by the controller for pilot input. It can also comprise discrete switches mounted near the display, voice recognition, or remotely mounted switches. Switches can have high quality, gold-plated contacts for desirable reliability. The sensor interface converts analog signals from commercially-available temperature, pressure, and other analog sensors to digital signals that can be processed by the microcomputer. The controllers can be implemented using commercially available switching devices and current sensing devices, with interfaces to the microcomputer.

A suitable controller can be implemented with a conventional single board microcomputer, with discrete logic, with programmable logic, or application specific integrated circuits, or combinations thereof. A typical microprocessor is a Motorola HCS12 or comparable with built-in serial I/O and at least 256 KB of non-volatile memory. A programmable controller implementation can execute software developed using conventional programming techniques such as C programming language.

The particular sizes and equipment discussed above are cited merely to illustrate particular embodiments of the invention. It is contemplated that the use of the invention can involve components having different sizes and characteristics. It is intended that the scope of the invention be defined by the claims appended hereto.

We claim:

1. A method for communicating engine status of an aircraft during climb to a pilot, comprising:
    a) accepting from a human a designation of a target range of exhaust gas temperature and a designation of a reference cylinder of the engine;
    b) sensing the exhaust gas temperature of the reference cylinder while the aircraft is climbing;
    c) communicating to the pilot the sensed exhaust gas temperature and its relation to the target range of exhaust gas temperature.

2. A method of communicating exhaust gas temperature to a pilot of an aircraft, comprising:
    a) accepting an indication of a temperature display range, where the temperature display range is within a predetermined range comprising a high temperature alert limit and a low temperature alert limit;
    b) accepting from a human a designation of a reference cylinder;
    c) sensing the exhaust gas temperature of the reference cylinder while the aircraft is climbing; and
    d) displaying to the pilot an indication of the sensed temperature relative to the display range.

3. A method as in claim 2, further comprising sensing the exhaust gas temperature in at least one cylinder other than the reference cylinder, and displaying to the pilot an indication of the exhaust gas temperature in the other cylinder relative to the display range.

4. A method as in claim 2, further comprising providing an alert to the pilot if the sensed temperature is not within predetermined limits.

5. A method as in claim 2, wherein the display to the pilot is activated upon an input from the pilot requesting an exhaust gas temperature display.

6. A method as in claim 2, wherein the display to the pilot is activated upon determination that the aircraft is in climb mode where monitoring of exhaust gas temperature is desired.

7. A method as in claim 2, wherein accepting an indication of a temperature display range further comprises accepting an indication of a target temperature.

8. A method as in claim 2, wherein the temperature display range is less than 40% of a total possible exhaust gas temperature range.

9. A method as in claim 8, wherein the temperature display range is less than 20% of the total possible exhaust gas temperature range.

10. A method as in claim 9, wherein the temperature display range is less than 10% of the total possible exhaust gas temperature range.

11. An apparatus for the communication of exhaust gas temperature to a pilot of an aircraft, comprising:
- a) a plurality of exhaust gas sensors, each mounted with an engine of the aircraft such that the sensor provides a signal representative of exhaust gas temperature corresponding to a cylinder of the engine;
- b) a display;
- c) a pilot input system, configured to accept a request for an exhaust gas temperature display and a designation of: (i) a reference cylinder, and (ii) a target exhaust gas temperature; and
- d) a controller, configured to use the display to present to the pilot the exhaust gas temperatures provided by the sensors while the aircraft is climbing relative to a predetermined range of temperatures, where the predetermined range comprises a high temperature alert limit and a low temperature alert limit.

12. An apparatus as in claim 11, wherein the pilot input system is configured to accept the predetermined range of temperatures from the pilot.

13. An apparatus as in claim 11, wherein the pilot input system is configured to accept designation of a reference cylinder from the pilot, and wherein the controller highlights the display of the exhaust gas temperature in the reference cylinder.

* * * * *